UNITED STATES PATENT OFFICE.

BENJAMIN F. HEBARD, OF NEPONSET, MASSACHUSETTS.

IMPROVEMENT IN BURNING-FLUID COMPOSITIONS.

Specification forming part of Letters Patent No. 31,457, dated February 19, 1861.

*To all whom it may concern:*

Be it known that I, BENJAMIN F. HEBARD, of Neponset, in the town of Dorchester, in the county of Norfolk and State of Massachusetts, have invented a new and useful Fluid Composition for Illuminating Purposes; and I do hereby declare that the nature of the same and the manner of compounding or manufacturing it are fully set forth in the following specification.

The component parts or ingredients of the said composition, with their proportions, may be stated as follows: twenty-five wine-gallons of fusel-oil; fifteen wine-gallons of camphene or rectified oil of turpentine; five wine-gallons of kerosene-oil distilled from coal or bituminous shale; one pound of some purifying essential oil—such as oil of lemon, for instance.

The main composition on which my invention is based is that of fusel-oil and the essential oil of turpentine.

I am aware that alcohol and oil of turpentine have been mixed together to form what is usually termed a "burning fluid"—that is, one to be used in a lamp, and to be burned from the wick thereof. I therefore do not claim this latter compound, as the fusel-oil and the oil of turpentine form a different composition, one superior, as a burning-fluid, to the other.

By combining the coal-oil with the fusel-oil and the essential oil of turpentine a composition is formed better than that of the fusel-oil and essential oil of turpentine. I employ the essential oil of lemon, not only for its carbon, but as a means of disguising or destroying the odor or odors of the other ingredients.

In making the composition the fusel-oil and essential oil of turpentine are to be poured together into a vessel (I prefer one of glass) furnished with a discharging-tube arranged in its bottom, which tube should be provided with a plug-valve or stop-cock. With the said two fluids from three to five gallons of water should be mixed, and the whole should be thoroughly stirred together, after which the mixture should be allowed to remain at rest until the water may have separated and subsided below the combination of fusel-oil and essential oil of turpentine. It will be found that all those impurities which are contained in the combination and tend to form a crust on the wick of a lamp will have been removed from such composition by the water, and with it may be drawn off or out of the vessel by opening the stop-cock or tube. After the water may have been thus removed, the kerosene and the perfuming essential oil—viz., the oil of lemon—with a gallon of water, should be added to the contents of the vessel, and the whole should be stirred, so as to thoroughly incorporate the several ingredients. After allowing a sufficient time for the water to subside, it may be drawn out of the vessel, the composition remaining in the vessel being that which I have found to be a very excellent burning-fluid to be used in a lamp.

The advantages of it may be thus stated: It emits no fetid matter or odor and is inexplosive. It will burn in what are termed "kerosene-lamps." It does not grease or soil fabrics. When used in a lamp, it does not consume so rapidly as coal-oil. While burning, its flame is whiter and softer than that of kerosene. It allows the wick of the lamp to be raised to a much greater height without smoking than is the case when kerosene is used. It forms little or no carbonaceous deposit on the wick.

I claim—

The composition of fusel-oil, kerosene, and spirits of turpentine, and its combination with a perfuming essential oil, as set forth.

BENJAMIN F. HEBARD.

Witnesses:
R. H. EDDY,
F. P. HALE, Jr.